(12) United States Patent
Gazzino et al.

(10) Patent No.: US 11,511,849 B2
(45) Date of Patent: Nov. 29, 2022

(54) METHOD OF PREPARING A DRONE FOR TAKEOFF, AND AN ASSOCIATED DRONE AND PREPARATION SYSTEM

(71) Applicant: AIRBUS HELICOPTERS, Marignane (FR)

(72) Inventors: Marc Gazzino, Marseilles (FR); Christophe Mouton, Tarascon (FR)

(73) Assignee: AIRBUS HELICOPTERS, Marignane (FR)

( * ) Notice: Subject to any disclaimer, the term of this patent is extended or adjusted under 35 U.S.C. 154(b) by 657 days.

(21) Appl. No.: 16/385,239

(22) Filed: Apr. 16, 2019

(65) Prior Publication Data
US 2019/0315458 A1    Oct. 17, 2019

(30) Foreign Application Priority Data

Apr. 16, 2018 (FR) ...................................... 1870460

(51) Int. Cl.
*B64C 19/00* (2006.01)
*B64D 47/06* (2006.01)
*B64C 39/02* (2006.01)

(52) U.S. Cl.
CPC ............ *B64C 19/00* (2013.01); *B64C 39/024* (2013.01); *B64D 47/06* (2013.01); *B64C 2201/08* (2013.01)

(58) Field of Classification Search
CPC ... B64C 19/00; B64C 39/024; B64C 2201/08; B64D 47/06; B64D 2045/0085; B64F 5/60
See application file for complete search history.

(56) References Cited

U.S. PATENT DOCUMENTS

| 4,813,393 A | * | 3/1989 | Lee | ........................ | F02P 5/1555 123/406.53 |
| 9,540,121 B2 | * | 1/2017 | Byers | ...................... | A47G 29/14 |
| 2007/0131822 A1 | | 6/2007 | Stallard | | |
| 2016/0070261 A1 | * | 3/2016 | Heilman | ............... | B64C 39/024 701/2 |
| 2017/0006340 A1 | * | 1/2017 | Enke | ..................... | B64C 39/024 |
| 2017/0267372 A1 | | 9/2017 | Donnard et al. | | |

FOREIGN PATENT DOCUMENTS

| CN | 201244361 Y | 5/2009 |
| CN | 104843193 A | 8/2015 |
| EP | 2925092 A1 | 9/2015 |
| EP | 3225546 A1 | 10/2017 |

OTHER PUBLICATIONS

French Search Report for FR 1870460, Completed by the French Patent Office, dated Nov. 29, 2018, All together 16 Pages.

* cited by examiner

*Primary Examiner* — Geepy Pe
*Assistant Examiner* — Paulo Roberto Gonzalez Leite
(74) *Attorney, Agent, or Firm* — Brooks Kushman P.C.

(57) ABSTRACT

A method and system of preparing a drone for takeoff are disclosed. The drone has at least one first control member and at least one second control member that are suitable for being actuated manually by at least one person in charge of preparing the drone for takeoff. The drone also includes a navigation light and at least one anticollision light for generating various mutually different light signals in a predetermined switch-on sequence.

15 Claims, 2 Drawing Sheets

METHOD OF PREPARING A DRONE FOR TAKEOFF, AND AN ASSOCIATED DRONE AND PREPARATION SYSTEM

CROSS-REFERENCE TO RELATED APPLICATIONS

This application claims priority to French patent application No. FR 1870460 filed on Apr. 16, 2018, the disclosure of which is incorporated in its entirety by reference herein.

BACKGROUND OF THE INVENTION

(1) Field of the Invention

The present invention relates to the field of drones having at least one motor (an electric motor or a fuel-burning engine) for driving at least one rotor in rotation in order to provide the drone with propulsion and/or lift.

(2) Description of Related Art

Such drones may in particular be formed by aircraft having no pilot or crew on board. In addition, such aircraft are commonly referred to as "unmanned aerial vehicles" (UAVs).

Furthermore, the invention also relates to the field of aircraft that may optionally be piloted by a pilot on board the aircraft. Such aircraft are generally referred to as "optionally piloted vehicles" (OPVs). Such aircraft thus correspond to a combination of the characteristics of a conventional aircraft serving to transport at least one pilot and of an aircraft of the UAV type not having any pilot on board.

Below, for the purposes of making the application simpler and easier to understand, the term "drone" is used to designate any aircraft of UAV or of OPV type, as described above.

In addition, such drones, as described in particular in documents CN 104 843 193, EP 3 225 546, US 2007/131822, and CN 201 244 361, are generally used for taking photographs or videos, e.g. during surveillance missions, or indeed for transporting and/or delivering objects or goods. Such drones thus need to fly close to populations, and in particular over towns.

In addition, during stages of preparing an aircraft of this type for takeoff, it frequently happens that the person or people in charge of starting the motor(s) or the rotor(s) can be injured by a moving rotor.

Document EP 2 925 092 describes navigation and anticollision lights for an aircraft enabling status information to be indicated by modulating the light they emit. Nevertheless, under no circumstances does such a document make it possible to guarantee the safety of people during stages of preparing the aircraft for takeoff.

BRIEF SUMMARY OF THE INVENTION

An object of the present invention is thus to propose a preparation method, a drone, and a preparation system that are safe so as to avoid endangering people handling the drone on the ground. Specifically, such a method needs to ensure that people are safe even after a failure of the remote control system of the drone or even after a failure of the drone.

In addition, such a method may be applied to any type of drone, and to any type of power plant for the rotor(s), such as, for example, one or more electric motors or fuel-burning engines.

The invention thus provides a method of preparing a drone for takeoff.

Such a method comprises at least:

a first manual actuation step of at least one person in charge of the preparation of the drone for takeoff actuating a first control member manually, the first actuation step serving to power electrically first calculation means and at least one electronic piloting system of said drone; and a first test step performed by the first calculation means, the first test step serving to perform at least one test of the operation of the electronic piloting system(s).

According to the invention, the method is remarkable in that it comprises at least:

a first switch step of switching on at least one navigation light arranged on the drone, the first switch step generating a first light signal representative of a positive result of the test(s) of the operation of the electronic piloting system(s);

a second manual actuation step of the person or people in charge of the preparation of the drone for takeoff actuating at least one second control member manually, the second actuation step serving to power electrically second calculation means and at least one control of at least one motor suitable for driving a rotor in rotation in order to provide the drone with propulsion and/or lift;

a second switch step of switching on at least one anticollision light arranged on the drone, the second switch step generating a second light signal different from the first light signal, the second light signal being representative of electrically powering the second calculation means and the control(s) of the motor(s);

a second test step performed by the second calculation means, the second test step serving to perform at least one test of the operation of the control(s) of the motor(s); and a third switch step of switching on the anticollision light(s) arranged on the drone, the third switch step generating a third light signal different from the first and second light signals, the third light signal being representative of a positive result of the test(s) of the operation of the control(s) of the motor(s) and of the preparation for takeoff of the drone coming to an end.

In other words, prior to starting the rotor(s), the person or people in charge of preparing the drone for takeoff need(s) to manipulate in succession the first control member(s) and then the second control member(s) in compliance with this predefined sequence. This succession of manual actuation steps performed by the person or people in charge of preparing the drone for takeoff is also combined with a succession of steps of switching on one or more navigation lights on the drone followed by one or more anticollision lights on the drone.

Such steps of switching on one or more lights then serve to generate mutually different light signals that enable the person or people in charge of preparing the drone for takeoff to know how far the takeoff preparation method has advanced and in particular to know whether it is still possible to be close to the drone without risk.

In addition, the first control member(s) and the second control member(s) may be formed by any type of switch, in particular of the type actuated manually or by using a key, or indeed actuated by touch, optically, magnetically, . . . .

Furthermore, the first and second calculation means may in particular be selected to be mutually different or to coincide with each other. By way of example, such first and second calculation means may respectively comprise a processor, an integrated circuit, a programmable system, or a logic circuit serving to perform various tests of the operation of the electronic piloting system(s) of the drone and of the control(s) of the motor(s).

In addition, the ground station may be formed by one or more computers or by portable electronic appliances, e.g. such as a touch tablet or a mobile telephone. These computer(s) and electrical portable appliance(s) may then advantageously be connected together via a wired or wireless type communications network, e.g. using mobile telephony protocols such as GSM, UMTS, LTE, Bluetooth, or WiFi.

Such a method is particularly advantageous for the safety of people since when the navigation light(s) is/are switched on, it is still possible for the person or people in charge of preparing the drone for takeoff to come close to the drone. However, once one or the other of the first and second anticollision lights is switched on, the person or people in charge of preparing the drone for takeoff can see immediately that they must keep away from the drone.

Advantageously, the method may include a first transmission step of transmitting first result data for the test(s) of the operation of the electronic piloting system(s), the first transmission step taking place from the drone to at least one ground station.

Such a first transmission step then makes it possible for the ground station to know exactly which step has been reached by the method for preparing the drone for takeoff. Naturally, for obvious security reasons, such a first transmission step may be encoded and/or encrypted in such a manner as to avoid any danger of interception by an unauthorized person. Furthermore, such a first transmission step may be performed before the first switch step of switching on the navigation light(s), or simultaneously therewith.

In practice, the method may include a second transmission step of transmitting data concerning the supply of electrical power to the control(s) of the motor(s), the second transmission step taking place from the drone to at least one ground station.

As above, this second transmission step enables the ground station to follow and identify precisely which steps of the preparation method have already been performed. As above, such a second transmission step may be performed before the second switch step of switching on the anticollision light(s), or simultaneously therewith.

In an advantageous embodiment of the invention, the method may include a third transmission step of transmitting data ordering execution of the second test step, the third transmission step being performed prior to the second test step and taking place from at least one ground station to the drone.

Such a third transmission step then enables the ground station to cause the second calculation means to be powered electrically in order to perform tests of the operation of the control(s) and of the motor(s). Naturally, for obvious security reasons, such a third transmission step may be encoded and/or encrypted in order to avoid any risk of interception by an unauthorized person.

Advantageously, the method may include a fourth transmission step of transmitting second result data of the test(s) of the operation of the control(s) of the motor(s), the fourth transmission step taking place from the drone to at least one ground station.

As above, such a fourth transmission step then enables the ground station to follow and identify precisely which steps of the preparation method have already been performed. Under such circumstances, the fourth transmission step may be performed before the third switch step of switching on at least one second anticollision light, or simultaneously therewith.

In practice, the method may include a fifth transmission step of transmitting data ordering execution of the third switch step for switching on at least one second anticollision light, the fifth transmission step being performed prior to the third switch step of switching on at least one anticollision light and taking place from at least one ground station to the drone.

Such a fifth transmission step then enables the ground station to order the third switch step of switching on the anticollision light(s) so as to inform the person or people in charge of preparing the drone for takeoff that takeoff of the drone is imminent.

In another advantageous embodiment of the invention, the first control member(s) may be arranged on the drone.

Specifically, such an arrangement of the first control member(s) enables the person or people in charge of preparing the drone for takeoff to initiate the first step of the preparation method very simply.

Likewise, the second control member(s) may be arranged on the drone.

Under such circumstances likewise, such an arrangement of the second control member(s) serves to centralize directly on board the drone the means for performing steps of the method of preparing the drone for takeoff.

Advantageously, the first control member(s) and the second control member(s) may be different from each other.

In this particular arrangement, the first control member(s) and the second control member(s) may be of various kinds. Thus, the second control member(s) may present a level of security enabling it/them to be actuated that is higher than the level required for actuating the first control member(s).

In practice, the anticollision light(s) may include at least one first anticollision light generating the second light signal and at least one second anticollision light generating the third light signal, the anticollision light(s) being different from the first anticollision light(s).

In contrast, in another variant of the invention where the first anticollision light(s) is/are the same as the second anticollision light(s), it is possible for example to vary brightness, color, direction, and/or frequency of flashing in order to enable the person or people in charge of preparing the drone for takeoff to identify a difference between the second light signal and the third light signal.

Furthermore, the second light signal may present a first brightness and the third light signal may present a second brightness, the first brightness being selected to be less than the second brightness.

Under such circumstances, it is by observing the brightness emitted by the anticollision light(s) that the person or people in charge of preparing the drone for takeoff can know the state of advance of the preparation method. In any event, whatever the brightness of the light signal emitted by the anticollision light(s), as soon as the anticollision light(s) is/are switched on, the person or people in charge of preparing the drone for takeoff must keep away from the drone.

In another advantageous embodiment of the invention, when the third switch step of switching on at least one second anticollision light is performed, the first control member(s) and the second control member(s) may be made inoperative.

Consequently, such an arrangement makes it possible to guard against any electrical power supply failure or any failure of the control(s) and/or of the motor(s).

The present invention also provides a drone including first calculation means and at least one electronic piloting system for piloting the drone.

Such a drone comprises:

at least a first control member suitable for being actuated manually by at least one person in charge of preparing the drone for takeoff, the first control member(s) presenting:

a first state S1 for electrically switching off the first calculation means and the electronic piloting system(s); and a second state S2 for electrically powering the first calculation means and the electronic piloting system(s), the first calculation means performing at least one test of the operation of the electronic piloting system(s).

According to the invention, the drone is remarkable in that it comprises:

at least one navigation light generating a first light signal representative of a positive result of the test(s) of the operation of the electronic piloting system(s);

at least one second control member suitable for being actuated manually by the person(s) in charge of preparing the drone for takeoff, the second control member(s) being different from the first control member(s), and presenting:

a first state S3 for switching off electrical power to second calculation means and to at least one control of at least one motor suitable for driving a rotor in rotation in order to provide the drone with propulsion and/or with lift;

a second state S4 for electrically powering the second calculation means and the control(s) of the motor(s), the second calculation means performing at least one test of the operation of the control(s) of the motor(s);

at least one anticollision light generating a second light signal different from the first light signal, the second light signal being representative of electrically powering the control(s) of the motor(s), said at least one anticollision light generating a third light signal different from the first and second light signals, the third light signal representing a positive result of the test(s) of the operation of the control(s) of the motor(s) and of the preparation of the drone for takeoff coming to an end.

In other words, when a person in charge of preparing the drone for takeoff actuates the first control member(s) in order to go from the first state S1 to the second state S2, the first calculation means are connected to an electrical power supply that may in particular be a battery arranged on board the drone or indeed a wired connection or a connection by induction with an electricity distribution network on the ground. The first calculation means are then electrically powered and perform at least one test of the operation of the electronic piloting system(s).

If the result of the test(s) of operation is positive, then the navigation light(s) is/are switched on, thereby informing the person or people in charge of preparing the drone for takeoff that the drone can begin testing the operation of the control of the rotor(s) and of the motor(s).

The person or people in charge of preparing the drone for takeoff can then actuate the second control member(s) in order to pass from the first state S3 to the second state S4. The second calculation means are then connected to the electrical power supply and they perform at least one test of the operation of the control(s) and of the motor(s).

So long as the test(s) of the operation of the control(s) and of the motor(s) is/are ongoing, the first anticollision light(s) is/are switched on, thereby generating the second light signal. Furthermore, once the test(s) of the operation of the control(s) and of the motor(s) has/have terminated, the second anticollision light(s) is/are switched on, thereby generating the third light signal.

Advantageously, the drone may include a first communications card for transmitting data from the drone to at least one ground station and/or for the drone receiving data from the ground station(s).

In this way, such a first communications card enables the drone to receive data sent by the ground station(s) and/or to send data to the ground station(s). Data may be transmitted using various wired or wireless type communications protocols.

In practice, at least one anticollision light may include at least a first anticollision light generating the second light signal and at least one second anticollision light generating the third light signal, the second anticollision light(s) being different from the anticollision light(s).

As already mentioned, the invention also provides a system for preparing a drone for takeoff.

According to the invention, such a system is remarkable in that it includes at least one drone as described above and at least one ground station including a second communications card enabling data to be transmitted from the drone to the ground station(s) and/or from the ground station(s) to the drone.

Such a second communications card then enables the ground station(s) to receive data sent by the drone, and/or to send data to the drone. Such a second communications card is thus suitable for communicating with the first communications card arranged on board the drone.

BRIEF DESCRIPTION OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures may be given the same references in each of them.

As mentioned above, the invention relates to the field of drones, and more particularly to means and methods for improving the safety of people in charge of putting such drones into operation prior to takeoff.

Figure 1:
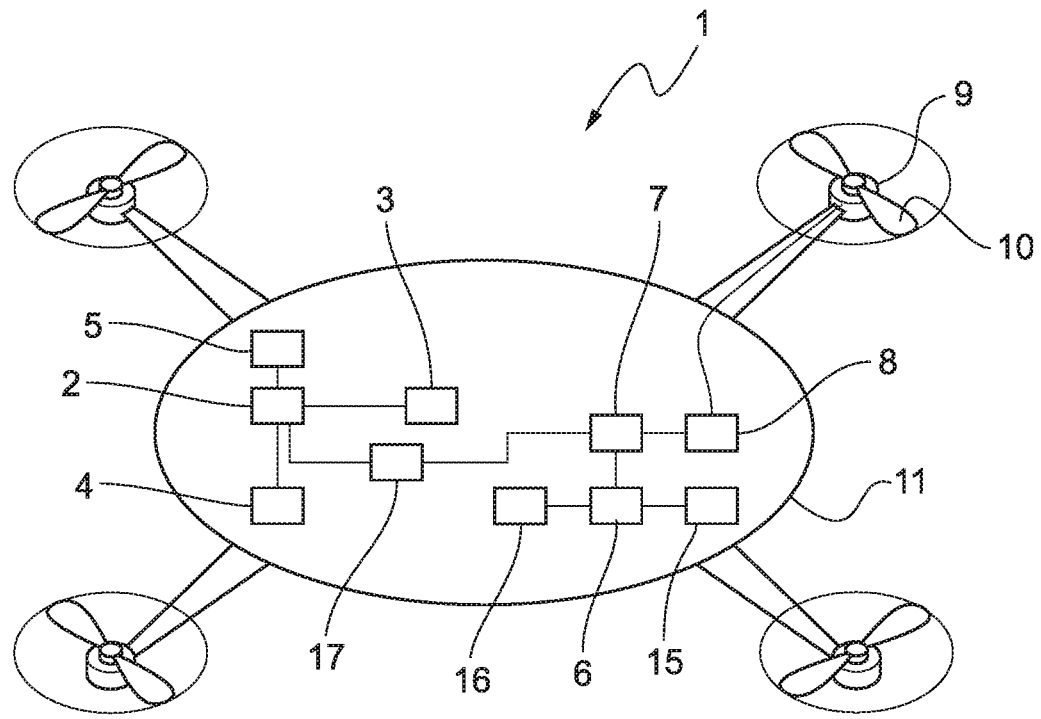
FIG. 1 is a perspective view of a drone in accordance with the invention.

As shown in FIG. 1, such a drone 1 may have one or more propulsion and/or lift rotors 10 secured to a frame 11. During takeoff and flight of such a drone 1, each rotor 10 is thus driven in rotation by at least one motor/engine 9, e.g. an electric motor.

The frame 11 may carry various safety members in order to avoid accidents with the person or people in charge of preparing the drone 1 for takeoff.

Thus, the frame 11 may be provided with first calculation means 2 serving to test the operation of at least one electronic system 3 for piloting the drone 1.

The frame 11 of the drone 1 also includes a first control member 4 suitable for being actuated manually by at least one person in charge of preparing the drone 1 for takeoff. In addition, this first control member 4 presents two mutually different states, namely a first state S1 for electrically switching off the first calculation means 2 and the electronic piloting system 3, and a second state S2 for electrically powering the first calculation means 2 and the electronic piloting system 3.

Once testing the operation of the electronic system 3 has terminated, a navigation light 5 may be switched on to generate a first light signal representing a positive result of this test of the operation of the electronic piloting system 3.

Furthermore, the drone 1 also has second calculation means 7 for testing the operation of at least one control 8 of at least one motor 9 suitable for driving a propulsion and/or lift rotor 10 in rotation.

In addition, the drone 1 has a second control member 6 that is manually actuatable by the person in charge of preparing the drone 1 for takeoff. As shown, this second control member 6 is selected to be separate from the first control member 4. Furthermore, the second control member 6 presents two other mutually different states, namely a first state S3 for electrically switching off the second calculation means 7 and the control 8 for controlling the motor(s) 9, and a second state S4 for electrically powering the second calculation means 7 and the control 8 of the motor(s) 9.

The drone 1 also has a first anticollision light 15 generating a second light signal that is different from the first light signal when the second calculation means 7 and the control 8 are electrically powered. The drone 1 also has a second anticollision light 16 generating a third light signal that is different from the first and second light signals whenever the result of testing the operation of the control 8 of the motor 9 is successful. Once the second anticollision light 16 is switched on, takeoff of the drone 1 is imminent.

Furthermore, such a drone 1 may advantageously include a first communications card 17 serving to transmit data from the drone 1 to at least one ground station and/or from the ground stations(s) to the drone 1.

Figure 2:
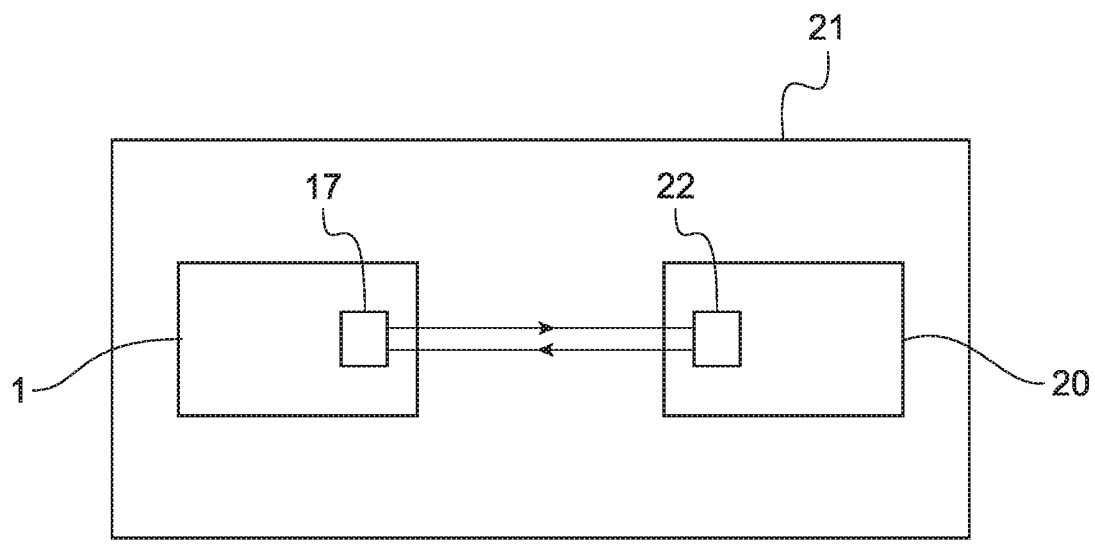
FIG. 2 is a block diagram of a preparation system in accordance with the invention.

Specifically, as shown in FIG. 2, the invention also applies to the system 21 for preparing the drone 1 for takeoff. In addition to the drone 1 as described above, such a preparation system 21 also comprises a ground station 20 that may for example be constituted by a computer or by a portable electrical member. The ground station 20 then has a second communications card 22 suitable for communicating with the first communications card 17 in order to enable data to be transmitted from the drone 1 to the ground station 20 and/or from the ground station 20 to the drone 1.

Figure 3:
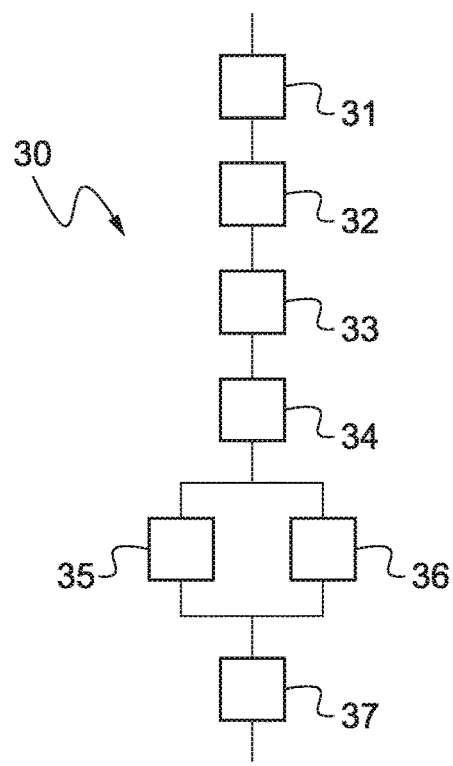
FIG. 3 is a flow chart showing a first implementation of a method of the invention for preparing the drone for takeoff.
Figure 4:
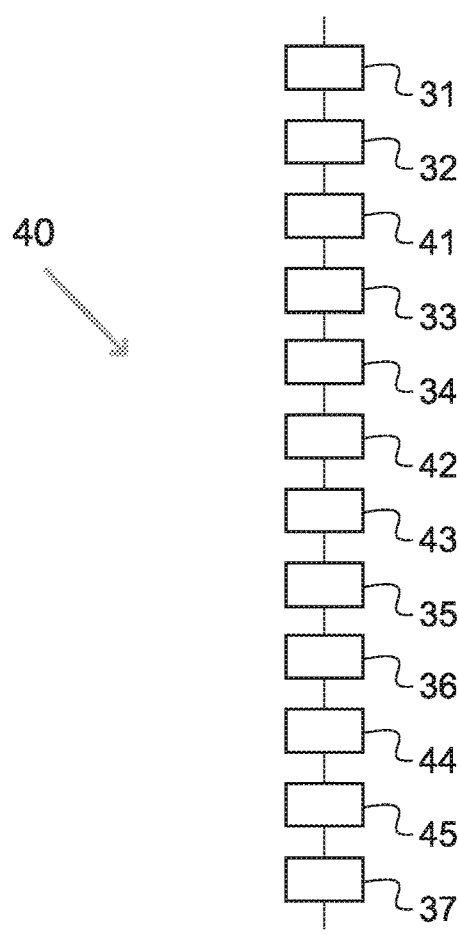
FIG. 4 is another flow chart showing a second implementation of a method in accordance with the invention for preparing the drone for takeoff.

As shown in FIGS. 3 and 4, the invention also provides a method 30, 40 of preparing a drone 1 for takeoff. Such a preparation method 30, 40 is thus performed in order to avoid any risk of accident or injury to any person involved with preparing a drone 1 for takeoff.

In addition, such a method 30, 40 has a first actuation step 31 of the person or people in charge of preparing the drone 1 for takeoff actuating the first control member 4 manually. This first actuation step 31 then serves to power electrically the first calculation means 2 and the electronic piloting system 3.

Thereafter, the method 30, 40 has a first test step 32 that is performed by the first calculation means 2. This first test step 32 then serves to perform at least one test of the operation of the electronic piloting system 3.

The method 30, 40 then has a first switch step 33 of switching on the navigation light 5 arranged on the drone 1. This first switch step 33 thus serves to generate a first light signal representing a positive result of the test(s) of the operation of the electronic piloting system 3.

The method 30, 40 also has a second actuation step 34 of the person or people in charge of preparing the drone 1 for takeoff actuating the second control member 6 manually. This second actuation step 34 then serves to power electrically the second calculation means 7 and the control 8 of the motor 9.

The method 30, 40 has a second switch step 35 of switching on the first anticollision light 15 in order to generate a second light signal that is different from the first light signal. Such a second light signal represents the second calculation means 7 and the control 8 of the motor 9 being powered electrically.

The method 30, 40 also has a second test step 36 performed by the second calculation means 7. This second test step serves specifically to perform at least one test of the operation of the control 8 of the motor 9.

As shown in FIG. 3, in a first implementation of the preparation method 30, this second switch step 35 may be performed simultaneously in parallel with the second test step 36.

In addition, as shown in FIG. 4, in a second implementation of the preparation method 40, this second switch step 35 may alternatively be performed beforehand in series with the second test step 36.

Finally, the method 30, 40 has a third switch step 37 of switching on the second anticollision light 16. Such a third switch step 37 then serves to generate a third light signal that is different from the first and second light signals. In addition, this third light signal then represents a positive result of the test(s) of the operation of the control 8 of the motor 9. The drone 1 is then ready to take off.

As shown in FIG. 4, the method 40 may also include various additional steps of transmitting data between the drone 1 and the ground station 20.

Thus, the method 40 has a first transmission step 41 of transmitting first data concerning the result of the test(s) of the operation of the electronic piloting system 3. This first transmission step 41 may advantageously be performed before the first switch step 33 of switching on the navigation light 5, and takes place from the drone 1 to the ground station 20. Naturally, in another variant that is not shown, such a first transmission step 41 could equally well be performed simultaneously with the first switch step 33 of switching on the navigation light 5.

The method 40 also has a second transmission step 42 of transmitting data concerning the supply of electrical power to the control 8 of the motor 9. This second transmission step 42 is then performed prior to the second switch step 35 of switching on the first anticollision light 15, and likewise takes place from the drone 1 to the ground station 20. As above, in a variant that is not shown, this second transmission step 42 could equally well be performed simultaneously with the second switch step 35 of switching on the first anticollision light 15.

The method 40 has a third transmission step 43 of transmitting data ordering execution of the second test step 36. This third transmission step 43 is thus performed prior to the second test step 36 and takes place from the ground station 20 to the drone 1.

The method 40 also has a fourth transmission step 44 of transmitting second result data concerning the result of the test(s) of the operation of the control 8 of the motor 9. Thus, this fourth transmission step 44 may be performed before the third switch step 37 of switching on the second anticollision light 16 and it takes place from the drone 1 to the ground station 20. Still in a variant that is not shown, the fourth transmission step 44 could be performed simultaneously with the third switch step 37 of switching on the second anticollision light 16.

Finally, the method 40 has a fifth transmission step 45 of transmitting data ordering execution of the third switch step 37 of switching on the second anticollision light 16. This fifth transmission step 45 is then performed prior to the third switch step 37 of switching on the second anticollision light 16, and takes place from the ground station 20 to the drone 1.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of preparing a drone for takeoff, the method comprising at least:
    a first manual actuation step of at least one person in charge of the preparation of the drone for takeoff actuating at least one first control member arranged on the drone manually, the first actuation step serving to power electrically first calculation means and at least one electronic piloting system of the drone; and
    a first test step performed by the first calculation means, the first test step serving to perform at least one test of the operation of the electronic piloting system(s);
    wherein the method further comprises at least:
    a first switch step of switching on at least one navigation light arranged on the drone, the first switch step generating a first light signal representative of a positive result of the test(s) of the operation of the electronic piloting system(s);
    a second manual actuation step of the at least one person in charge of the preparation of the drone for takeoff actuating at least one second control member manually, the second actuation step serving to power electrically second calculation means and at least one control of at least one motor suitable for driving a rotor in rotation in order to provide the drone with propulsion and/or lift;
    a second switch step of switching on at least one anticollision light arranged on the drone, the second switch step generating a second light signal different from the first light signal, the second light signal being representative of electrically powering the second calculation means and the control(s) of the motor(s);
    a second test step performed by the second calculation means, the second test step serving to perform at least one test of the operation of the control(s) of the motor(s); and
    a third switch step of switching on the anticollision light(s) arranged on the drone, the third switch step generating a third light signal different from the first and second light signals, the third light signal being representative of a positive result of the test(s) of the operation of the control(s) of the motor(s) and of the preparation for takeoff of the drone coming to an end.

2. The method according to claim 1, wherein the method includes a first transmission step of transmitting first result data for the test(s) of the operation of the electronic piloting system(s), the first transmission step taking place from the drone to at least one ground station.

3. The method according to claim 1, wherein the method includes a second transmission step of transmitting data concerning the supply of electrical power to the control(s) of the motor(s), the second transmission step taking place from the drone to at least one ground station.

4. The method according to claim 1, wherein the method includes a third transmission step of transmitting data ordering execution of the second test step, the third transmission step being performed prior to the second test step and taking place from at least one ground station to the drone.

5. The method according to claim 1, wherein the method includes a fourth transmission step of transmitting second result data of the test(s) of the operation of the control(s) of the motor(s), the fourth transmission step taking place from the drone to at least one ground station.

6. The method according to claim 1, wherein the method includes a fifth transmission step of transmitting data ordering execution of the third switch step for switching on the anticollision light(s), the fifth transmission step being performed prior to the third switch step of switching on at least one anticollision light and taking place from at least one ground station to the drone.

7. The method according to claim 1, wherein the second control member(s) is/are arranged on the drone.

8. The method according to claim 1, wherein the first control member(s) and the second control member(s) are different from each other.

9. The method according to claim 1, wherein the anticollision light(s) include(s) at least one first anticollision light generating the second light signal and at least one second anticollision light generating the third light signal, the second anticollision light(s) being different from the first anticollision light(s).

10. The method according to claim 1, wherein the second light signal presents a first brightness and the third light signal presents a second brightness, the first brightness being selected to be less than the second brightness.

11. The method according to claim 1, wherein, when the third switch step of switching on at least one second anticollision light is performed, the first control member(s) and the second control member(s) are made inoperative.

12. A drone including first calculation means and at least one electronic piloting system for piloting the drone, and
    at least a first control member suitable for being actuated manually by at least one person in charge of preparing the drone for takeoff, the first control member(s) presenting:
    a first state S1 for electrically switching off the first calculation means and the electronic piloting system(s); and
    a second state S2 for electrically powering the first calculation means and the electronic piloting system(s), the first calculation means performing at least one test of the operation of the electronic piloting system(s);
    wherein the drone further comprises:
    at least one navigation light generating a first light signal representative of a positive result of the test(s) of the operation of the electronic piloting system(s);
    at least one second control member suitable for being actuated manually by the at least one person in charge of preparing the drone for takeoff, the second control member(s) being different from the first control member(s), and presenting:
    a first state S3 for switching off electrical power to second calculation means and to at least one control of at least one motor suitable for driving a rotor in rotation in order to provide the drone with propulsion and/or with lift;

a second state S4 for electrically powering the second calculation means and the control(s) of the motor(s), the second calculation means performing at least one test of the operation of the control(s) of the motor(s);

at least one anticollision light generating a second light signal different from the first light signal, the second light signal being representative of electrically powering the second calculation means and the control(s) of the motor(s), the anticollision light(s) generating a third light signal different from the first and second light signals, the third light signal representing a positive result of the test(s) of the operation of the control(s) of the motor(s) and of the preparation of the drone for takeoff coming to an end.

13. The drone according to claim 12, wherein the drone includes a first communications card for transmitting data from the drone to at least one ground station and/or receiving data from the ground station(s).

14. The drone according to claim 12, wherein the at least one anticollision light includes at least a first anticollision light generating the second light signal and at least one second anticollision light generating the third light signal, the second anticollision light(s) being different from the first anticollision light(s).

15. A system comprising:

a drone including first calculation means, at least one electronic piloting system for piloting the drone, and at least a first control member suitable for being actuated manually by at least one person in charge of preparing the drone for takeoff, the first control member(s) presenting:

a first state S1 for electrically switching off the first calculation means and the electronic piloting system(s); and a second state S2 for electrically powering the first calculation means and the electronic piloting system(s), the first calculation means performing at least one test of the operation of the electronic piloting system(s);

wherein the drone further includes at least one navigation light generating a first light signal representative of a positive result of the test(s) of the operation of the electronic piloting system(s) and at least one second control member suitable for being actuated manually by the at least one person in charge of preparing the drone for takeoff, the second control member(s) being different from the first control member(s), and presenting:

a first state S3 for switching off electrical power to second calculation means and to at least one control of at least one motor suitable for driving a rotor in rotation in order to provide the drone with propulsion and/or with lift;

a second state S4 for electrically powering the second calculation means and the control(s) of the motor(s), the second calculation means performing at least one test of the operation of the control(s) of the motor(s);

wherein the drone further includes at least one anticollision light generating a second light signal different from the first light signal, the second light signal being representative of electrically powering the second calculation means and the control(s) of the motor(s), the anticollision light(s) generating a third light signal different from the first and second light signals, the third light signal representing a positive result of the test(s) of the operation of the control(s) of the motor(s) and of the preparation of the drone for takeoff coming to an end; and at least one ground station;

wherein the drone further includes a first communications card for transmitting data from the drone to the at least one ground station and/or for receiving data from the ground station(s); and the at least one ground station including a second communications card enabling data to be received from the drone and/or transmitted from the ground station(s) to the drone.

* * * * *